Oct. 25, 1955   R. E. FRANCOIS   2,721,971
IMPULSE MECHANISM FOR TESTING ELECTRON TUBES
Filed June 9, 1954

ROBERT E. FRANCOIS
INVENTOR

BY *G. D. O'Brien*
*Q. Baxter Warner*
ATTORNEYS

United States Patent Office 2,721,971
Patented Oct. 25, 1955

2,721,971

IMPULSE MECHANISM FOR TESTING ELECTRON TUBES

Robert E. Francois, Edmonds, Wash., assignor to the United States of America as represented by the Secretary of the Navy Application June 9, 1954, Serial No. 435,656

5 Claims. (Cl. 324—20)

The present invention relates to impulse mechanisms in general and in particular to an improved impulse mechanism for imparting controlled mechanical shocks to an electron tube.

It is well known that certain environmental conditions in the application of electron tubes may excite fluctuations in the output voltages of the tubes corresponding to mechanical vibrations of the tube electrodes. The undesired fluctuations, generally termed microphonics, are due to variations in the plate resistance of the tube occasioned by changes in the spacing between the electrodes. Since many types of electron tubes employ electrodes of a filamentary character having little natural damping, it is generally possible to excite vibrations in all of the electrodes of such tubes with resulting fluctuations in the outputs thereof. The amplitude of the vibrations of the electrodes can be controlled by careful design of the structure, nevertheless, it is not possible to eliminate completely such vibrations. Moreover, slight departures from the original design are likely to occur in manufacture, thus upsetting the original intention of producing a tube relatively free from microphonics.

It is therefore important to determine individually which of a batch of tubes, manufactured according to mass production techniques, are acceptable as not being disposed to generate excessive microphonic outputs. As has previously been discussed all commonly encountered types of electron tubes can be forced to produce microphonic outputs to some extent. The proper test for microphonic tubes should therefore involve measurement of the fluctuating output of the tube under closely controlled conditions of vibration excitation. Only thus can a reliable measure of the tube quality be obtained without resulting in excessive rejections, or the acceptance of many unsatisfactory tubes.

Vibration excitation can be provided variously. The means of excitation fall generally into two categories, namely, impulse testers characterized by a sudden shock imparted to the test article, and shake or spin testers, characterized by the periodic applications of force. Of these, the impulse tester is more satisfactory for locating microphonic tubes, since a tube will respond to an impulse by vibrating at its natural frequency. On the other hand, if periodic forces are applied to the tube, it is frequently necessary to apply forces at several frequencies to determine resonance within the tube. The advantages of impulse testing are evident in that resonance by a body can be determined simply by the application of a single impulse rather than a series of forces. In order that the qualitative nature of the tests be preserved, it is important that each tube be tested by impulses of uniform intensity. Otherwise, if the amplitude of output oscillations resulting from a blow is the test criterion, a blow of undue severity would generate sufficient fluctuations to indicate an unsatisfactory tube. Conversely, a weak blow would not disclose a tube dangerously microphonic.

Accordingly, it is an object of the present invention to provide a mechanism for releasing a controlled amount of energy in the form of an impulse thereby permitting the testing of a large number of electron tubes under uniform conditions.

It is another object of the present invention to provide an impulse mechanism which can be operated by unskilled personnel.

Another object of the present invention is the provision of an impulse mechanism having characteristics which do not vary over extended periods of time.

Other objects and many of the attendant advantages of this invention will be readily appreciated as the same becomes better understood by references to the following detailed description when considered in connection with the accompanying drawings, wherein.

Briefly, the present invention comprises a pivotally mounted hammer arranged to be driven against a resiliently supported tube. A spring interconnects the hammer with a disc which is rotatable about the pivot axis of the hammer. By rotating the disc, the spring can be loaded and released to drive the hammer against the tube. In addition, means are provided for varying the magnitude of the impact of the hammer against the tube. An impulse mechanism is thereby provided which possesses the advantage of imparting a uniform amount of energy to tubes under test for extended periods of operation.

Figure 1:
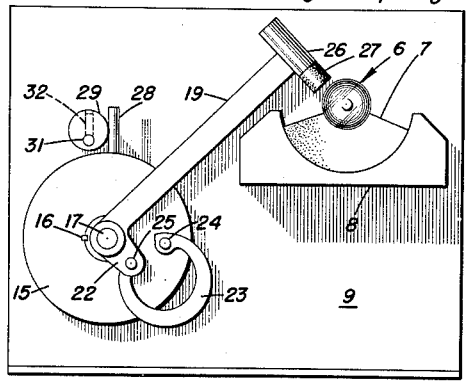
Fig. 1 is an elevation view of the impulse mechanism of the present invention showing the spring in an unloaded position.

Referring to Fig. 1, there is shown generally, an electron tube 6 whose microphonic output is to be determined. A support for the tube 6 is formed by a cushion 7 of resilient material, such as rubber, resting on a cradle 8. The cradle 8 extends laterally from a vertical mounting plate 9. The cushion 7 and cradle 8 are shaped to provide a resilient support of uniform thickness disposed beneath the tube so that the forces transmitted by the cushion will pass through the center of gravity of the tube.

The cushion 7 performs several important functions. As an isolator of shock, the cushion prevents shattering of the tube envelope by impacts imparted to the tube during testing. As a decoupler, the cushion permits vibration of the tube electrodes in their various natural modes without interaction between the modes and at the same time prevents vibrations of the cradle from influencing the tube.

Figure 2:
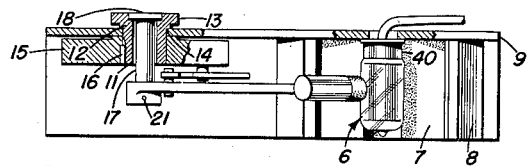
Fig. 2 is a plan view of the mechanism shown in Fig. 1 with portions thereof broken away to illustrate the pivotal mounting of the hammer.

Referring now to Figs. 1 and 2 where there is shown the means for storing energy within a spring and releasing said energy to excite vibrations of the electrodes of the tube 6, a hollow shaft 11, enlarged at one end to provide a shoulder 12 and an operating knob 13, is journaled in an aperture 14 in the mounting plate 9 by a disc 15. The disc 15 is fixed to the shaft 11 by a key 16. An axle 17, having a head 18 formed thereon, extends loosely through the shaft 11 so as to be rotatable independently of shaft 11. The axle 17 thus forms a free running center of rotation for a hammer 19 which is fixed to the axle 17 by a pin 21. A crank arm 22 is formed integral with the hammer 19 and a C-shaped spring 23 interconnects a stud 24 projecting laterally from the face of disc 15 with a similar stud 25 extending laterally from the inner surface of the crank arm 22. The spring 23 is both extensible and compressible thereby providing elastic forces of either tension or compression according to its deformation. The spring 23 is free to rotate about the studs 24 and 25 so that only the forces of tension or compression acting along a line between stud 24 and stud 25 are effective in the operation of the mechanism.

The hammer 19 is equipped with a head 26 having a face 27 of resilient material similar to that which forms the cushion 7. The hammer head 26 increases the moment of inertia of the hammer 19 thus permitting increased momentum to be attained by said hammer at moderate hammer velocities. The brittle glass envelope of the tube 6 is incapable of withstanding velocity shocks of great intensity, so that it is desirable to transfer as much as possible of the kinetic energy of the hammer 19 to the tube 6 without requiring the tube to suddenly acquire a high velocity. The safe transfer of energy from the hammer to the tube is aided by the fact that the resilient face 27 and cushion 7 permit a slight displacement of the tube to occur upon impact.

Motion of the disc 15 in a counter-clockwise direction is limited by means of a stop 28 projecting radially from the periphery of said disc. When the disc 15 is rotated in a counter-clockwise direction by means of the operating knob 13, the motion will eventually be arrested by the engagement of the stop 28 with an eccentric cam 29 which is fixed to rotate with a shaft 31 projecting laterally from the mounting plate 9. A set screw 32 is provided to lock the cam 29 in a desired position on the shaft 31. Means are thus provided for controlling the intensity of the impact imparted to the tube 6 under test, by permitting more or less of the kinetic energy of the hammer to be absorbed in extending the spring prior to impact.

Referring now to Figs. 1, 3, 4, and 5, where the impulse mechanism is shown during various phases of one cycle of operation, the mechanism is shown in Fig. 1 in its first equilibrium position with the spring 23 in an unstressed condition. The disc 15 is shown in its maximum counter-clockwise position with the stop 28 engaging the cam 29. In this position the stud 24, as controlled by the cam 29, provides a clearance between the face 27 of the hammer 19 and the tube 6. The provision of sufficient clearance is essential to the proper operation of the mechanism when it is desired that but a single blow be struck during testing. Otherwise the decaying oscillations of the hammer 19, occasioned by the elastic rebound of the hammer, will result in the tube 6 being struck several times during one test, and the characteristics of the impulse mechanism, particularly the natural frequency thereof, would alter the nature of the results from those originally intended to be obtained. On the other hand, adequate clearance will allow oscillations of the hammer 19 to be dissipated harmlessly in the air after the first blow has been struck. In this manner, results can be obtained from the test which depend primarily upon vibrations of the electrodes of the tube in their natural modes.

It will be understood that the distance between stud 24 and stud 25 is fixed in length for the unstressed condition of the spring 23 and if the distance between the studs is changed, the spring will be stressed either in tension or in compression, according to whether the length is increased or decreased. As the studs 24 and 25 are rotated oppositely about the axle 17 from the position shown in Fig. 1, the distance separating the studs first diminishes, reaching a minimum when the axle 17 and the studs 24 and 25 are at dead center, the second equilibrium position. Continued rotation in the same direction, moving stud 25 back of dead center, results in an increase from the minimum distance separating the studs to a distance somewhat less than the unstressed distance shown in Fig. 1.

Figure 3:
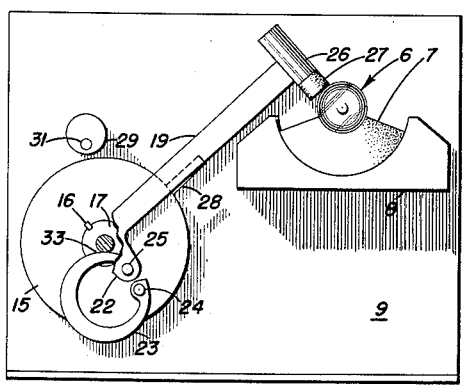
Fig. 3 is a view similar to Fig. 1 except that portions of the mechanism have been broken away to illustrate the position of the spring in a loaded condition.

Whenever the spring 23 is in a stressed condition and the position of the studs 24 and 25 is other than dead center, the compression or tension of the spring gives rise to moments which tend to cause relative rotation between the hammer 19 and the disc 15. In Fig. 3, stud 25 is shown in a position back of dead center with the spring 23 stressed in compression. A moment thereby arises tending to cause rotation of the hammer 19 in a counter-clockwise direction; however, in arriving at the position shown in Fig. 3, the spring 23 is carried about stud 24 in a clockwise direction until the leg 33 of spring 23 abuts the axle 17. Thus, a third position of equilibrium is obtained wherein the moments created by the spring stress are opposed by moments created by the reaction of axle 17 against the leg 33 of spring 23.

Figure 4:
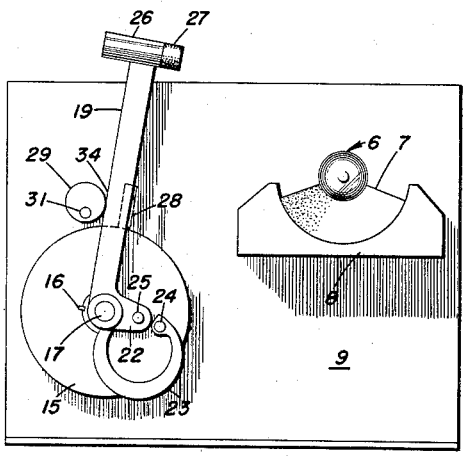
Fig. 4 is a view similar to Fig. 1 showing the hammer rotated to a discharge position.
Figure 5:
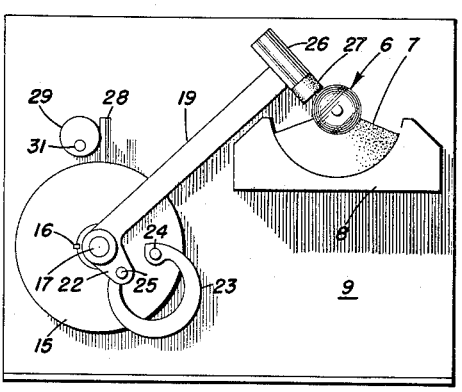
Fig. 5 is a view similar to Fig. 1 showing the mechanism at the instant of impact.

The energy stored by the spring 23 in the third equilibrium position (Fig. 4) is subsequently released to drive the hammer 19 against the tube 6 to excite vibrations of the tube electrodes. Fig. 4 illustrates the mechanism immediately prior to the discharge of the spring 23. The disc 15, rotated from the position shown in Fig. 3 by means of operating knob 13 (Fig. 2), is temporarily arrested from further counter-clockwise rotation by the edge 34 of hammer 19 engaging the cam 29. The spring 23 is discharged by the application of torque to knob 13 sufficient to overcome the counter-clockwise torque generated by the compression of said spring. Stud 25 is thereby caused to rotate clockwise past the dead center position with the result that the torque applied to the hammer 19 by the spring 23 reverses to drive the hammer against the tube, as seen in Fig. 5.

Obviously, the operation of the mechanism requires that the edge 34 of the hammer 19 engage the cam 29 sufficiently in advance of the stop 28 to permit the rotation of the stud 25 through dead center. The appropriate condition can be obtained either by suitably positioning the stop 28 or by altering the width of the hammer 19, as desired.

It will be observed that the hammer momentum depends almost completely upon the energy contained by the spring. Therefore, the mechanism can be relied upon to supply uniform conditions of impact during the course of many tests without regard to the personal influence of an operator thereof. Moreover, if the mechanism is stored in the unstressed condition shown in Fig. 1, the spring will not be subject to elastic creep and can reasonably be expected to maintain constant characteristics for extended periods of time.

In use, it is merely necessary to position a tube to be tested upon the cushion 7. Electrical connections are established by a plug or other connection 40 for the purpose of observing the fluctuations in the output of the tube resulting from the impact of the test.

The operating knob 13 is then rotated causing the face 27 of the hammer 19 to bear against the tube 6 and loading the spring 23, as seen in Fig. 3. The loaded mechanism is moved to the position of release (Fig. 4) by rotating the knob 13 in the opposite direction. The mechanism can then be discharged by a slight additional turn, releasing the spring and driving the hammer against the tube (Fig. 5). It will be understood that the operator must necessarily hold the knob 13 firmly during the release of the hammer to insure that the energy contained by the spring is converted principally to hammer motion rather than joint motion of the hammer and disc. The stop 28 facilitates in preserving a fixed position of the disc 15 during the discharge of the hammer, and need only be held in engagement with the cam 29 to preserve the same position of the stud 24 relative to the tube 6 during many tests. If it be desired to alter the force of the impact of the hammer against the tube, the cam 29 can be rotated about the center 31 to move the final position of the stud 24 closer or farther from the tube, thereby resulting in less or more of the kinetic energy of the hammer being absorbed in extending the spring prior to impact.

Obviously many modifications and variations of the present invention are possible in the light of the above teachings. It is therefore to be understood that within the scope of the appended claims the invention may be practiced otherwise than as specifically described.

What is claimed is:

1. A mechanism for imparting mechanical shocks to an electron tube, comprising means for supporting said electron tube, a pivotally mounted hammer having a head and a crank arm, a disc mounted to rotate about the pivot axis of said hammer, means for rotating said disc, spring means interconnecting said disc and said crank arm, means for limiting the rotation of said disc, and means for limiting the rotation of said hammer.

2. A device as claimed in claim 1, wherein said means for supporting said electron tube comprises a cradle having a curved inner surface in spaced relation to the surface of said tube facing said cradle, and a cushion of resilient material interposed between said inner surface and said tube.

3. An impulse mechanism for exciting mechanical vibrations within an electron tube having an outer envelope, comprising a cradle having an arcuate surface, a cushion of resilient material resting on said surface and supporting said tube, a pivotally mounted hammer having a crank arm, said hammer being arranged to strike said tube envelope, a disc rotatable about the pivot axis of said hammer, spring means interconnecting said disc and said crank arm, a stop projecting from the periphery of said disc, and an adjustable cam arranged to engage said stop.

4. An impulse mechanism for exciting microphonic vibrations within an electron tube, comprising a cradle faced with resilient material for supporting said tube, a hammer having a head faced with resilient material, an axle forming a pivotal mounting for said hammer at the end opposite said head, a disc coaxial with said axle, an operating knob for rotating said disc, a crank arm connected to the pivot end of said hammer to rotate said hammer, a spring interconnecting said crank arm and said disc, a stop projecting from the periphery of said disc, a movable cam to engage said stop and limit the motion of said disc, and means for limiting the motion of said hammer.

5. A mechanism for imparting mechanical shocks directly to an electron tube, comprising a support for said tube, said support consisting of a cradle having an inner surface in spaced relation to the periphery of said tube and a cushion of resilient material interposed between said inner surface and said tube periphery, an axle spaced from said support, a hammer connected to said axle to strike said tube, said hammer having a head faced with resilient material, a crank arm connected to said hammer and carrying a stud, a hollow shaft freely rotatable about said axle, a knob connected to said hollow shaft at the end thereof remote from said hammer, a disc connected to said hollow shaft at the end proximate said hammer, a second stud carried by said disc, a stop projecting from the periphery of said disc, a cam to engage said hammer and said stop, and a C-shaped spring connected at the ends between said first stud and said second stud and rotatable about either of said studs as a center upon relative motion of the other of said studs.

References Cited in the file of this patent

UNITED STATES PATENTS

| 2,281,324 | Preston | Apr. 28, 1942 |
| 2,458,033 | Sterner | Jan. 4, 1949 |
| 2,476,297 | Harris | July 19, 1949 |